(12) United States Patent
Uno et al.

(10) Patent No.: US 7,057,252 B2
(45) Date of Patent: Jun. 6, 2006

(54) OPTICAL INFORMATION RECORDING MEDIUM

(75) Inventors: Mayumi Uno, Izumi (JP); Rie Kojima, Kadoma (JP); Noboru Yamada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/842,010

(22) Filed: May 6, 2004

(65) Prior Publication Data
US 2004/0222479 A1    Nov. 11, 2004

(30) Foreign Application Priority Data
May 9, 2003    (JP)    ............... 2003-132141

(51) Int. Cl.
*H01L 31/0232*    (2006.01)

(52) U.S. Cl. ............... 257/432; 257/432; 257/436
(58) Field of Classification Search ............... 257/432, 257/431, 435, 436; 369/272, 275
See application file for complete search history.

(56) References Cited

U.S. PATENT DOCUMENTS

| | | | |
|---|---|---|---|
| 5,002,812 A * | 3/1991 | Umehara et al. | ......... 428/64.9 |
| 5,645,908 A | 7/1997 | Shin | |
| 6,395,366 B1 | 5/2002 | Kim | |
| 2002/0022105 A1 | 2/2002 | Kitaura et al. | |

FOREIGN PATENT DOCUMENTS

| | | |
|---|---|---|
| JP | 2002-133712 | 5/2002 |
| KR | 1996-0019102 | 6/1996 |
| KR | 2001-0047949 | 6/2001 |

OTHER PUBLICATIONS

Takeo Ohta, et al., "New write-once media based on Te-TeO2 for optical disks", Proceedings of SPIE, vol. 695, 1986, pp. 2-9.
Kenichi Nishiuchi, et al., "Dual-Layer Optical Disk with Te-O-Pd Phase-Change Film", Japanese Journal of Applied Physics, vol. 37, Apr. 1998, pp. 2163-2167.
Hiroshi Kubota, "Wave Optics", chapter 3, Iwanami Shoten, 1971 (with partial translation).

* cited by examiner

*Primary Examiner*—David Nelms
*Assistant Examiner*—Thinh T Nguyen
(74) *Attorney, Agent, or Firm*—Hamre, Schumann, Mueller & Larson, P.C.

(57) ABSTRACT

The optical information recording medium of the present invention includes an information layer provided on a substrate. The information layer includes: a recording layer with respect to which information can be recorded and reproduced through irradiation with a laser beam having a predetermined wavelength; a first protective layer that is located, with respect to the recording layer, on the side to which the laser beam is incident; and a second protective layer that is located, with respect to the recording layer, on the opposite side to the side to which the laser beam is incident. The refractive index $n1$ of the first protective layer and the refractive index $n2$ of the second protective layer at the predetermined wavelength of the laser beam that is used for recording and reproduction satisfy a relationship of $n2<n1$.

14 Claims, 5 Drawing Sheets

FIG. 2A

Range of n1 > n2

| n1\n2 | 1.6 | 1.8 | 2.0 | 2.2 | 2.4 | 2.6 | 2.8 |
|---|---|---|---|---|---|---|---|
| 2.8 | 15 | 14 | 12 | 12 | 11 | 11 | 10 |
| 2.6 | 14 | 13 | 12 | 11 | 10 | 10 | 9 |
| 2.4 | 13 | 12 | 10 | 9 | 9 | 8 | 8 |
| 2.2 | 12 | 10 | 9 | 8 | 7 | 7 | 6 |
| 2.0 | 10 | 8 | 7 | 6 | 5 | 5 | 4 |
| 1.8 | 7 | 6 | 4 | 4 | 3 | 3 | 3 |
| 1.6 | 5 | 4 | 2 | 2 | 2 | 1 | 1 |

FIG. 2B

Range of n1 > n2

| n1\n2 | 1.6 | 1.8 | 2.0 | 2.2 | 2.4 | 2.6 | 2.8 |
|---|---|---|---|---|---|---|---|
| 2.8 | 7 | 6 | 6 | 6 | 6 | 6 | 3 |
| 2.6 | 8 | 8 | 7 | 7 | 7 | 6 | 4 |
| 2.4 | 9 | 8 | 8 | 7 | 7 | 6 | 5 |
| 2.2 | 9 | 8 | 8 | 7 | 6 | 6 | 6 |
| 2.0 | 9 | 8 | 7 | 6 | 5 | 5 | 4 |
| 1.8 | 7 | 5 | 4 | 3 | 2 | 2 | 1 |
| 1.6 | 3 | 0 | – | – | – | – | – |

FIG. 2C

Range of n1 > n2

| n1\n2 | 1.6 | 1.8 | 2.0 | 2.2 | 2.4 | 2.6 | 2.8 |
|---|---|---|---|---|---|---|---|
| 2.8 | 58 | 59 | 59 | 60 | 60 | 60 | – |
| 2.6 | 54 | 56 | 58 | 59 | 59 | 59 | – |
| 2.4 | 54 | 55 | 57 | 59 | 61 | 60 | – |
| 2.2 | 52 | 56 | 56 | 58 | 59 | – | – |
| 2.0 | 52 | 55 | 58 | – | – | – | – |
| 1.8 | 54 | – | – | – | – | – | – |
| 1.6 | – | – | – | – | – | – | – |

Range of n1 > n2

| 2.8 | 10 | 10 | 10 | 10 | 10 | 10 | 9 |
|---|---|---|---|---|---|---|---|
| 2.6 | 10 | 10 | 10 | 10 | 10 | 9 | 9 |
| 2.4 | 9 | 9 | 10 | 9 | 9 | 8 | 8 |
| 2.2 | 10 | 9 | 9 | 9 | 9 | 9 | 9 |
| 2.0 | 10 | 9 | 9 | 9 | 9 | 8 | 8 |
| 1.8 | 7 | 7 | 7 | – | – | – | – |
| 1.6 | – | – | – | – | – | – | – |
| n1/n2 | 1.6 | 1.8 | 2.0 | 2.2 | 2.4 | 2.6 | 2.8 |

FIG. 3

Range of n1 > n2

| 2.8 | 18 | 18 | 18 | 18 | 18 | 18 | 16 |
|---|---|---|---|---|---|---|---|
| 2.6 | 18 | 19 | 19 | 17 | 18 | 16 | 16 |
| 2.4 | 20 | 20 | 19 | 19 | 18 | 18 | 17 |
| 2.2 | 20 | 20 | 20 | 19 | 19 | 18 | 18 |
| 2.0 | 19 | 18 | 18 | 18 | 18 | 17 | 17 |
| 1.8 | – | – | – | – | – | – | – |
| 1.6 | – | – | – | – | – | – | – |
| n1/n2 | 1.6 | 1.8 | 2.0 | 2.2 | 2.4 | 2.6 | 2.8 |

FIG. 4

OPTICAL INFORMATION RECORDING MEDIUM

BACKGROUND OF THE INVENTION

1. Field of the Invention

The present invention relates generally to an optical information recording medium that allows information to be recorded and reproduced at a high density and a high speed through an optical means such as, for example, laser beam irradiation.

2. Related Background Art

Optical information recording media such as, for instance, magneto-optic recording media and recording media of a phase-change type, have been known as media that allow a large quantity of information to be recorded and reproduced at a high speed. In these optical information recording media, the change in optical characteristics of a recording material that is caused when the recording material is irradiated locally with a laser beam is used for recording marks. These optical information recording media have great advantages in that they permit random access as needed and have excellent portability. Hence, recently, their significance has been increasing more and more. The demand for them is increasing in various fields including a medical field, an academic field, etc. and for various purposes including, for example, recording and storing personal data or image information with computers and substituting for home video tapes. Nowadays, these optical information recording media have been required to achieve further increases in capacity, density, and speed due to the improvements in performance of applications and quality of image information.

The conventional optical information recording media include rewritable recording media in which information can be rewritten multiple times and write-once recording media in which information can be written only once. Generally, the write-once recording media often have a smaller number of layers than that included in the rewritable recording media. Accordingly, the write-once recording media can be manufactured easily at lower cost. In addition, they are convenient for writing data that a user wants to prevent from being destroyed since they are not rewritable. Furthermore, they have a long storage life and high reliability. Thus, they are expected to be in great demand for archival use. Hence, conceivably, the widespread use of high-density, rewritable recording media results in further increase in demand for high-density, write-once recording media.

Conventionally, a recording material whose main component is a material containing, for instance, Te and O (hereinafter also referred to as "Te—O") has been proposed as an example of the recording material for the write-once type. It has been disclosed that the use of the recording material whose main component is Te—O (Te—$TeO_2$, which is a mixture of Te and $TeO_2$) allows a large signal amplitude and considerably high reliability to be obtained (see, for instance, T. Ohta, K. Kotera, K. Kimura, N. Akahira, and M. Takenaga, "New write-once media based on Te—$TeO_2$ for optical disks", Proceedings of SPIE, Vol. 695 (1986), pp. 2–9). When a recording layer formed of such a recording material is used alone, a large signal amplitude can be obtained in the case of a so-called Lo-to-Hi configuration in which the recording layer has a low reflectance in the as-deposited state (i.e. the state immediately after the formation thereof, hereinafter also referred to as an "as-depo state") and a high reflectance after information is recorded therein. On the other hand, it has been disclosed that when the recording layer is interposed between layers formed of dielectrics, a large signal amplitude can be obtained even in the case of a so-called Hi-to-Lo configuration in which the recording layer has a high reflectance in the as-depo state and a low reflectance after information is recorded therein (see, for instance, JP2002-133712A). Generally, the optical information recording media of the rewritable type have the Hi-to-Lo configuration. Hence, it is preferable that in the write-once recording media, the change in reflectance occurs in the same manner as in the rewritable recording media, since this allows information to be recorded more easily in write-once recording media using a drive for the rewritable recording media.

Furthermore, it is intended to increase the capacity of recording media in which a Te—O-based recording material is used by using a plurality of information layers stacked together (see, for instance, K. Nishiuchi, H. Kitamura, N. Yamada, and N. Akahira, "Dual-Layer Optical Disk with Te—O—Pd Phase-Change Film", Japanese Journal of Applied Physics, Vol. 37 (1998), pp. 2163–2167). This reference discloses the technique of recording and reproducing information with respect to two information layers through laser beam irradiation alone that is carried out from one side, wherein the two information layers are stacked with an intermediate layer being interposed therebetween.

However, in order to achieve further increase in capacity of the optical information recording media, information is written under conditions for achieving higher density, for instance, using a laser beam with a shorter wavelength within a bluish-purple wavelength region and an objective lens having a numerical aperture (NA) of at least 0.80. This raises a problem that a favorable jitter value cannot be obtained readily. Furthermore, in media including a plurality of information layers stacked together, when information is recorded or reproduced with respect to each information layer through the laser beam irradiation that is carried out from one side under the conditions for achieving higher density, the information layer located on the laser beam incident side must have a sufficiently high transmittance with respect to the laser beam and favorable recording characteristics. However, when the transmittance of the information layer is kept high; for instance, at least 50%, it is difficult to obtain a favorable jitter value, which is a problem. In the conventional optical information recording media described above, no consideration has been taken to obtain a favorable jitter value when a plurality of information layers are stacked together or when information is recorded under the conditions for achieving higher density. For instance, it has not been considered to provide the media with means for obtaining higher signal quality when the in-plane recording density in the recording film is increased using a laser beam with a wavelength within the bluish-purple wavelength region and an objective lens having a NA of at least 0.80. Moreover, in the case of media with a multilayer configuration in which a plurality of information layers are stacked together, it also has not been considered to improve the transmittance of the information layer located closest to the laser beam incident side of the plurality of information layers while maintaining high signal quality.

In order to solve the problems described above, it is possible to make an effective optical design by using an optical multiple interference effect that is obtained by providing the information layer with a more complicated configuration. However, this is not preferable since, for example, optical information recording media of the write-once type are required to include information layers that each have a simple configuration and to be manufactured at low cost.

SUMMARY OF THE INVENTION

An object of the present invention is to provide an optical information recording medium in which a favorable jitter value and high transmittance can be obtained simultaneously when recording is carried out under conditions for achieving high density.

In order to achieve the object mentioned above, an optical information recording medium of the present invention includes a substrate and an information layer provided on the substrate. The information layer includes: a recording layer with respect to which information can be recorded and reproduced through irradiation with a laser beam having a predetermined wavelength; a first protective layer that is located, with respect to the recording layer, on the side on which the laser beam is incident; and a second protective layer that is located, with respect to the recording layer, on the opposite side to which the laser beam is incident. The refractive index n1 of the first protective layer and the refractive index n2 of the second protective layer at the predetermined wavelength of the laser beam satisfy a relationship of n2<n1.

BRIEF DESCRIPTION OF THE DRAWINGS

FIGS. 2A to 2C each are tables showing an example of the effect of improving optical design values in the present invention.

FIG. 3 is a table showing an example of the effect of improving optical design values in the present invention.

FIG. 4 is a table showing an example of the effect of improving optical design values in the present invention.

DETAILED DESCRIPTION OF THE INVENTION

Figure 1:
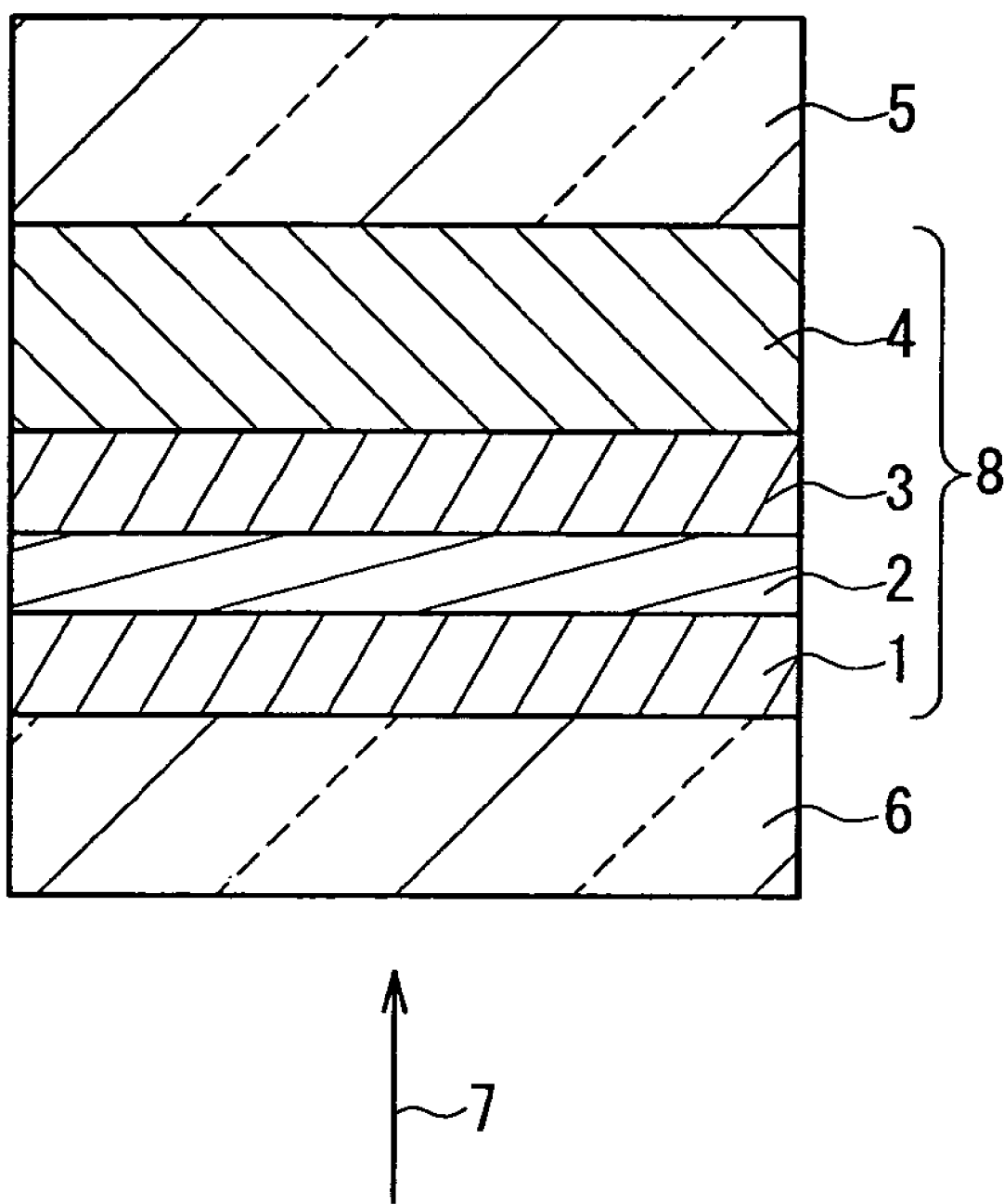
FIG. 1 is a cross-sectional view showing an embodiment of an optical information recording medium according to the present invention.

In the optical information recording medium of the present invention, the information layer includes the recording layer and the protective layers (the first protective layer and the second protective layer that are located, with respect to the recording layer, on the laser beam incident side and on the opposite side thereto, respectively), with the recording layer being interposed therebetween. In the information layer, the refractive index n1 of the first protective layer is larger than the refractive index n2 of the second protective layer, with respect to the predetermined wavelength of the laser beam that is used for recording and reproduction. This allows a favorable jitter value to be obtained even when recording is carried out under the conditions for achieving high density. In addition, even when the information layer is designed to have a high transmittance, for instance, at least 50%, favorable recording sensitivity and a favorable jitter value can be obtained. Accordingly, high signal quality can be obtained even when a multilayer configuration is employed in which another information layer is stacked together with the information layer described above. In this connection, the configuration of the additional information layer is not particularly limited. It should be noted that the predetermined wavelength is not particularly limited. The predetermined wavelength is a wave length of a laser beam that is used for recording or reproducing with respect to the optical information recording medium of the present invention.

In this optical information recording medium, it is preferable that the information layer has a transmittance of at least 50% with respect to the laser beam having the predetermined wavelength, with the recording layer being in the unrecorded state. This allows the information layer to be of an optical transmission type. Hence, an optical information recording medium with a multilayer configuration can be obtained that is formed of a plurality of information layers including another information layer stacked together with the information layer described above. When the information layer can be of the optical transmission type as mentioned above, it is preferable that the optical information recording medium includes a first information layer to an N-th information layer (where N denotes an integer of 2 or larger) that are provided on the substrate sequentially from the laser beam incident side, and at least the first information layer has the same configuration as that of the information layer described above. This allows an optical information recording medium with larger capacity to be obtained.

The information layer of the optical information recording medium according to the present invention further may include a reflective layer that is located on the opposite side to the laser beam incident side with respect to the second protective layer. This allows a more favorable jitter value to be obtained readily. Preferably, the reflective layer has a thickness of 15 nm or less. This allows the information layer to have a sufficiently high transmittance when the information layer is of an optical transmission type. Furthermore, it is preferable that the reflective layer contains at least one element selected from the group consisting of Ag, Cu, and Au. In this case, the reflective layer can have high thermal conductivity. Accordingly, even when the reflective layer is thin, a great heat dissipation effect can be obtained. Thus, it is possible to obtain both the high transmittance and great heat dissipation effect simultaneously.

Preferably, the refractive index n1 of the first protective layer satisfies the range of n1>2.0. This allows the information layer to have a large difference between the reflectance in the recorded state and that in the unrecorded state. Furthermore, it is preferable that the refractive index n1 of the first protective layer and the refractive index n2 of the second protective layer satisfy a condition of n1−n2>0.2. This enables the present invention to fully exhibit its effect (the improvement in signal quality). It also is preferable that the second protective layer contains at least one of an oxide and a fluoride. In this case, not only the range of the preferable refractive index mentioned above can be satisfied readily but also the protective layer can have relatively low thermal conductivity. Accordingly, favorable signal characteristics can be obtained easily. Preferably, the second protective layer contains at least one compound selected from the group consisting of $ZrO_2$, $SiO_2$, $Cr_2O_3$, $Al_2O_3$, $SnO_2$, $ZnO$, $Ga_2O_3$, and $LaF_3$.

In the optical information recording medium of the present invention described above, the recording layer that is included in the information layer is not particularly limited, and the same effect is obtained regardless of whether the medium is used as a write-once medium or a rewritable medium. The above-mentioned optical information recording medium according to the present invention can be used favorably when it is of the write-once type because the write-once type can achieve high-density recording with a simple configuration. When the optical information recording medium is of the write-once type, the recording layer may be formed of a material containing Te, O, and M, where M denotes at least one element selected from the group consisting of a metallic element, a metalloid element, and a semiconductor element. When the recording layer is formed of such a material, a larger signal amplitude can be obtained readily. It is further preferable that the M contains at least one element selected from the group consisting of Pd, Au, Pt, Ag, Cu, Ni, Sb, Bi, Ge, Sn and In. In this case, a recording layer of the write-once type that has a considerably high crystallization rate can be obtained easily.

Moreover, when the optical information recording medium is of the write-once type, the recording layer may be formed of a material that contains O and at least one element selected from the group consisting of Sb, Sn, In, Ge, Ni, Mo, W, Zn, and Ti. When the recording layer is formed of such a material, a large signal amplitude can be obtained as in the case mentioned above.

Furthermore, the recording layer may include at least two isolation layers and the optical characteristics of the recording layer may change after the laser beam irradiation. When the recording layer itself is formed to have a multilayer configuration, a recording mechanism can be used in which the laser beam irradiation causes a reaction of at least one of the isolation layers to change the optical characteristics. Similarly in this case, a large signal amplitude can be obtained.

An embodiment of the present invention is described using a specific example with reference to the drawings as follows.

FIG. 1 shows an example of the layer configuration of an optical information recording medium according to the present embodiment.

In FIG. 1, an information layer 8 and an optically transparent layer 6 are provided on a substrate 5. FIG. 1 shows an example of an optical information recording medium in which the information layer 8 is composed of a first protective layer 1, a recording layer 2, a second protective layer 3, and a reflective layer 4 that are located sequentially from the side on which a laser beam 7 is incident. The example to be described in the present embodiment is an optical information recording medium of the write-once type.

The substrate 5 and the optically transparent layer 6 are protective members that serve to prevent the optical information recording medium from being scratched or oxidized. Since the laser beam 7 that has passed through the optically transparent layer 6 is used for recording and reproduction, the optically transparent layer 6 is formed using a material that is optically transparent with respect to the laser beam 7 or that has a negligible level of optical absorptance (for instance, 10% or less) even if the material absorbs light. In the example shown in FIG. 1, the laser beam 7 is incident from the optically transparent layer 6 side. However, the laser beam 7 may be incident from the substrate 5 side. In this case, the substrate 5 also has to be formed of a material that is optically transparent with respect to the laser beam 7.

Examples of the materials of the substrate 5 and the optically transparent layer 6 include various resins such as polycarbonate, polymethyl metacrylate, and polyolefin resins, and glass.

A substrate produced in a predetermined form by, for instance, molding, or one formed from a sheet-like material to have a predetermined form may be used as the optically transparent layer 6. In addition, an ultraviolet curable resin may be used for the optically transparent layer 6, wherein the ultraviolet curable resin is optically transparent with respect to the laser beam 7 that is used for recording and reproduction. In this case, it is advantageous that the optically transparent layer 6 is produced to have uniform thickness in a predetermined range. In this context, the optically transparent layer 6 denotes all transparent layers that are provided on the laser-beam incident side with respect to the first protective layer 1. Accordingly, for instance, when a transparent sheet is bonded using a transparent ultraviolet curable resin, the whole is referred to as the optically transparent layer 6.

Preferably, guide grooves or pits for guiding the laser beam are formed in at least one of the optically transparent layer 6 and the substrate 5 on its side on which the recording layer 2 is provided.

As described above, since the present embodiment is described using the write-once recording medium as an example, the recording layer 2 is formed of a material that can change irreversibly between at least two states in which optical characteristics of the recording layer 2 are different from each other. The use of such a recording material makes it possible to obtain an optical information recording medium of the write-once type that allows information to be written only once. Examples of the recording material to be used for the write-once type include oxides such as Te—O, Sb—O, Sn—O, In—O, Ge—O, Ni—O, Mo—O, W—O, Zn—O, and Ti—O, and materials including a suitable mixture thereof. When such oxide materials are used, a great difference in optical characteristics can be obtained between the recorded and unrecorded states and therefore there is an advantage that a large signal amplitude can be obtained readily. The recording mechanism of the respective materials described above has not been made completely clear. With respect to the Te—O, Sb—O, Sn—O, and In—O materials, however, it has been conceived that the laser beam irradiation causes crystal particles to increase in size as described later. For instance, in the case of the Te—O material, a material containing Te—O—M (where "M" denotes at least one selected from a metallic element, a metalloid element, and a semiconductor element) is used practically. The "Te—O—M" is a material containing Te, O, and M and is a composite material that includes fine particles of Te, Te—M and M dispersed uniformly and randomly in the $TeO_2$ matrix in the as-depo state. When a film formed of this recording material is irradiated with a laser beam, the film is melted and Te or Te—M crystals with larger particle sizes are produced. The difference obtained between the optical states before and after the irradiation can be detected as signals and thereby so-called "write-once recording" can be carried out in which information can be written only once. Particularly, the use of a Te—O material as the recording material is preferable because it allows a large signal amplitude to be obtained more readily.

In the case of using the recording material containing Te—O—M, specific examples of M include elements such as Pd, Au, Pt, Ag, Cu, Sb, Bi, Ge, Sn, In, Ti, Zr, Hf, Cr, Mo, W, Co, Ni, and Zn, and mixtures thereof. Particularly, the use of a material containing at least one element selected from Pd, Au, Pt, Ag, Cu, Sb, Bi, Ge, Sn, and In is preferable since a higher crystallization rate can be obtained. Among others noble metal such as, for example, Au or Pd is preferable since its use allows a particularly high crystallization rate to be obtained.

Examples of another material of the recording layer 2 may include Se-based materials such as Se—Sb, Se—Ge, Se—Ge—Sb, and Se—S, materials whose phase changes between amorphous phases such as those containing Bi—Cu, Bi—Ge, or Si—In, and perforation-type materials, such as those containing Ge—S and Sb—S.

In another example of the configuration of the recording layer 2, at least two isolation layers may be stacked therein. The isolation layers may be made of different materials from each other. In this case, the recording mechanism can be used in which laser beam irradiation allows at least a part of the isolation layers to react and thereby different optical characteristics can be obtained. For example, a two-layered product can be used as the recording layer. The two-layered product includes an isolation layer containing at least one element selected from Ag, Au, and Cu and an isolation layer containing at least one of metalloids and semiconductors of, for instance, Si, Ge, Sn, Sb, Bi, Se, Te, and In. More specifically, the two-layered product may be formed of an isolation layer containing Ag or a Ag alloy and an isolation layer containing Si, which is abbreviated as Ag (alloy)/Si (the same applies to the following), Ag (alloy)/Ge, Ag (alloy)/In, Au (alloy)/Sn, Au (alloy)/Te, Cu (alloy)/Si, Cu (alloy)/Ge, or the like. In the case of this example, when the complex refractive index of each isolation layer in the as-depo state is indicated as "n-ik" (where n denotes a refractive index and k indicates an extinction coefficient), any of Ag, Au, and Cu can have a small refractive index n and a large extinction coefficient k in the visible light wavelength region (approximately from 350nm to 800nm). On the other hand, the semiconductors or metalloids can have a large refractive index n and a small extinction coefficient k, or a refractive index n and a refractive index k that are similar values to each other. When the two isolation layers, each of which contains any material mentioned above, are irradiated with a laser beam, a reaction such as, for instance, alloying occurs in the recording layer composed of such isolation layers and thereby its complex refractive index changes. Accordingly, its state after the reaction can be distinguished optically through comparison with its as-depo state.

Another material may be added suitably to each of the at least two isolation layers. For instance, when an oxygen element or a nitrogen element is added, the thermal conductivity can be lowered and thereby a favorable jitter value can be obtained. The addition of a material having a passivation effect such as, for instance, Cr, Si, or Al provides an effect of improving corrosion resistance. Hence, it is preferable that such a material is added suitably.

The materials of the recording layer 2 are not limited to the examples described above but may be any materials as long as they can take two states that can be distinguished optically from each other. A difference in the materials does not limit the present invention.

The reflective layer 4 is formed of metal such as, for instance, Au, Ag, Cu, Al, Ni, Cr, or Ti, or an alloy of metals selected suitably. The reflective layer 4 is provided to obtain a heat dissipation effect and optical effects such as, for example, effective optical absorption taking place in the recording layer. Preferably, the reflective layer 4 has a thickness of at least 1 nm. This is because when the reflective layer 4 has a thickness of less than 1 nm, it is difficult to form the reflective layer 4 in a uniform layer form and thereby the thermal and optical effects are reduced. When the information layer 8 of the optical transmission type is to be formed, it is preferable that the reflective layer 4 has a thickness of 15 nm or less. If the reflective layer 4 is thicker than 15 nm, it has a relatively high optical absorptance and this makes it difficult for the reflective layer 4 to have a high transmittance. When the information layer 8 of the optical transmission type is to be provided with a high transmittance as described above, it is further preferable that the reflective layer 4 contains at least one of Ag, Cu, and Au. In this case, it is easy to ensure that relatively less absorption of the laser beam 7 occurs in the reflective layer 4. Hence, there are provided not only an optical advantage in that a high transmittance can be obtained readily but also an advantage in that a film with a uniform thickness can be obtained easily even when a relatively thin film, for instance, having a thickness of 15 nm or less is formed. Particularly, when the wavelength of the laser beam 7 to be used is in the range of blue or bluish purple wavelengths (specifically, between 300 nm and 450 nm), it is preferable that the reflective layer 4 contains at least Ag. Ag has a refractive index that reduce the optical absorption even with respect to a wavelength within the range of blue or bluish purple wavelengths described above. Thus, due to the optical causes described above, the information layer 8 with a high transmittance can be obtained further readily.

The first protective layer 1 and the second protective layer 3 are provided for the main purposes of protecting the recording material and adjusting optical characteristics, for instance, allowing the information layer 8 to absorb light efficiently. The present embodiment is designed to satisfy a relationship of $n2<n1$, where $n1$ denotes the refractive index of the first protective layer 1 at the wavelength of the laser beam 7 while $n2$ indicates the refractive index of the second protective layer 3 at the wavelength of the laser beam 7. This allows the recording layer 2 to have a high optical absorptance. Hence, even when using a simple layer configuration shown in FIG. 1 as an example, a larger signal amplitude can be obtained. Furthermore, when the information layer 8 is of the optical transmission type, it is easy to obtain both a high transmittance and a high optical absorptance of the recording layer 2 simultaneously.

In order to make further detailed descriptions, the following optical calculations were made. With respect to the optical information recording medium shown in FIG. 1, optical characteristics were determined by the optical calculations. The optical characteristics were obtained when the recording layer 2 was formed of a Te—O—Pd film with a thickness of 10 nm, the reflective layer 4 was formed of a Ag alloy film with a thickness of 10 nm, the laser beam 7 had a wavelength of 405 nm, and the refractive index $n1$ of the first protective layer 1 and the refractive layer $n2$ of the second protective layer 3 at the wavelength of 405 nm were changed variously. In the case of this example, since both the recording layer 2 and the reflective layer 4 are relatively thin, specifically thinner than 20 nm, the information layer 8 was of the optical transmission type. The optical calculations were made using a common method that was called "the matrix method" (see, for example, Chapter 3, "Wave Optics" written by Hiroshi KUBOTA, published by Iwanami Shoten). Values actually obtained through measurements with a spectroscope were used as optical constants of the respective layers. Recording was made using the so-called "Hi-to-Lo configuration" in which a higher reflectance is obtained in the as-depo state and a lower reflectance is obtained in the recorded state. With respect to this optical information recording medium used as an example, the reflectance obtained in the as-depo state (before recording) is indicated with Ra(%), the reflectance obtained after recording is indicated with Rc(%) (where Ra>Rc), and the difference in reflectance (Ra−Rc) is indicated with ΔR(%), with the reflectances being obtained at the wavelength of a laser beam to be used for recording and reproduction.

FIG. 2A shows the maximum values of ΔR calculated with respect to the refractive indices n1 and n2. The maximum values of ΔR are obtained with each thickness of the first protective layer 1 and the second protective layer 3 being changed variously. In this case, the values of n1 and n2 were varied within the range of 1.6 to 2.8, which are values that can be obtained generally in a dielectric material that is used actually for the first protective layer 1 and the second protective layer 3. According to FIG. 2A, it can be seen that when the value of n1 (or n2) is constant, larger values of ΔR are obtained in the case of n2<n1 as compared to those obtained in the case of n1≦n2.

FIG. 2B shows the maximum values of ΔR calculated with respect to the refractive indices n1 and n2. The maximum values of ΔR are obtained with each thickness of the first protective layer 1 and the second protective layer 3 being changed within the range that allows a condition of Rc≦2.0 to be satisfied. This calculation was made because the C/N ratio of a recording signal is not only proportional to the magnitude of signal amplitude but also inversely proportional to that of noise, and thus it is necessary to pay attention to the value that is given by, for instance, ΔR/Rc (hereinafter, referred to as a "modulation factor"). That is, when the value of ΔR is large and the value of Rc is small, a high C/N ratio can be obtained. In the actual optical design, it is desirable that the value of Rc is determined to satisfy the condition of Rc≦2.0, for example. According to FIG. 2B, it can be seen that when the relationship of n2<n1 is satisfied, smaller values of Rc and larger values of ΔR are obtained. In FIG. 2B, the marks "−" indicate the cases where the relationship of Ra>Rc was not satisfied.

FIG. 2C shows light transmittances of the optical information recording medium at the laser beam wavelength that are indicated with respect to the refractive indices n1 and n2. The light transmittances each were obtained in the case where the value of ΔR was the maximum. The required values of ΔR and light transmittance depend on the number of information layers to be stacked together. For example, in the case of an optical information recording medium including two information layers stacked together, the information layer located on the laser beam incident side (on the side closer to the laser beam source) must be of the optical transmission type. It is preferable that this information layer located on the side closer to the laser beam source has a ΔR of at least 7% and a transmittance of at least 50%. According to FIGS. 2B and 2C, it can be seen that both a high value of ΔR and a high transmittance, namely at least 7% and at least 50%, respectively, are obtained simultaneously in the examples in which the refractive indices n1 and n2 are in the range that allows them to satisfy the relationship of n2<n1. Particularly, when the refractive indices n1 and n2 satisfy the ranges of 2.0≦n1≦2.6 and 1.8≦n2≦2.0, respectively, both a high value of ΔR and a high transmittance, namely at least 8% and at least 55%, respectively, are obtained simultaneously. Hence, it can be understood that preferably, the refractive indices n1 and n2 satisfy the ranges mentioned above. Furthermore, it is preferable that a condition of n1−n2≧0.2 is satisfied. In this case, a ΔR of at least 7% and a transmittance of at least 50% can be obtained more readily. However, when an information layer has a high transmittance (for instance, at least 60%) even if it has a ΔR of less than 7%, the information layer can be used as that located closer to the laser beam source. Hence, in FIG. 2C, with respect to the cases where at least one of the conditions, i.e. one of a ΔR of at least 7% and a transmittance of at least 60%, is satisfied, the transmittance values are shown, and the cases where the ΔR is less than 7% and the transmittance is lower than 60% are indicated with the mark "−".

When at least three information layers are stacked together and information is reproduced from the information layers using increased power, the ΔR may be smaller than 7%. In this case, however, the transmittance must be greater, specifically, for instance, at least 60%. Even in this case, the information layers can be designed so that both the required value of ΔR and high transmittance can be obtained simultaneously when the refractive indices n1 and n2 are set within the ranges described above.

Next, with respect to an example of optical design using another recording materials, optical calculations were made under the following conditions. That is, using the configuration shown in FIG. 1, the recording layer 2 was formed of a Sb—O film with a thickness of 30 nm, the reflective layer 4 was formed of an Al alloy film with a thickness of 40 nm, the laser beam 7 with a wavelength of 405 nm was used, and the refractive indices n1 and n2 were changed variously as in the example mentioned above. As in FIG. 2B, FIG. 3 shows the results of the calculations of maximum values of ΔR that were obtained with each thickness of the first and second protective layers 1 and 3 being changed within the range that allows a condition of Rc≦2.0 to be satisfied. As in the example mentioned above, it can be seen in this example that larger values of ΔR can be obtained in the range that allows a relationship of n1>n2 to be satisfied. Moreover, it is preferable that the condition of n1≧2.0 is satisfied since larger values of ΔR can be obtained under this condition. In FIG. 3, the marks "−" indicate the cases where a ΔR of at least 7% was not obtained.

An optical information recording medium was produced as an example of optical design using still another recording materials. It had the configuration shown in FIG. 1, and its recording layer 2 included two isolation layers. Optical calculations were made with the refractive indices n1 and n2 being changed as in the above, with respect to the case where the recording layer 2 included a 18-nm thick Si film and a 5-nm thick Ag film that were isolation layers stacked in this order from the laser beam incident side, the reflective layer 4 was formed of an Al-alloy film with a thickness of 40 nm, and the laser beam with a wavelength of 405 nm was used. As in FIG. 2B, FIG. 4 shows the results of the calculations of maximum values of ΔR that were obtained with each thickness of the first and second protective layers 1 and 3 being changed within the range that allows a condition of Rc≦2.0 to be satisfied. In this example, the largest values of ΔR determined within the range of Rc≦2.0 were obtained in the case where a relationship of n1>n2 was satisfied as in the examples mentioned above. Like the examples mentioned above, in order to obtain larger values of ΔR, it also is preferable that the condition of n1≧2.0 is satisfied. In FIG. 4, the marks "−" indicate the cases where a ΔR of at least 7% was not obtained.

Furthermore, optical calculations also were made with respect to the other materials described above as examples of the material of the recording layer 2. As a result, it was confirmed that a more favorable optical design was achieved when the relationship of n1>n2 was satisfied as in the examples described above. Moreover, it also was confirmed that when the condition of n1>2.0 was satisfied, larger values of ΔR were obtained in many cases. It also was found that further favorable optical design values were obtained when the condition of n1−n2>0.2 was satisfied.

The materials to be used for the first protective layer 1 and the second protective layer 3 may be various materials that allow the refractive indices n1 and n2 to satisfy the relationship of n2<n1. Examples of the materials include sulfides such as, for instance, ZnS, selenides such as, for instance, ZnSe, oxides such as, for example, Si—O, Ge—O, Al—O, Zn—O, Y—O, La—O, Ti—O, Zr—O, Hf—O, Nb—O, Ta—O, Cr—O, Mo—O, W—O, Sn—O, In—O, Sb—O, and Bi—O, nitrides such as, for example, Si—N, Ge—N, Al—N, Zn—N, Ti—N, Zr—N, Hf—N, Nb—N, Ta—N, Cr—N, Mo—N, W—N, Sn—N, and In—N, oxynitrides such as, for instance, Si—O—N, Ge—O—N, Al—O—N, Ti—O—N, Zr—O—N, Hf—O—N, Nb—O—N, Ta—O—N, Cr—O—N, Mo—O—N, W—O—N, Sn—O—N, and In—O—N, carbides such as, for instance, Ge—C, Cr—C, Si—C, Al—C, Ti—C, Zr—C, and Ta—C, fluorides such as, for example, Si—F, Al—F, Mg—F, Ca—F, and La—F, other dielectric materials, and suitable combinations thereof (for example, ZnS—SiO$_2$, Si—Al—O—N, Zr—Si—O, and Zr—Si—Cr—O).

After the preferable values of refractive indices n1 and n2 are calculated by the optical calculations, it is necessary to select the materials of the first and second protective layer 1 and 3 so that the relationship of n2<n1 is satisfied. Generally, many of the oxides and fluorides have lower refractive indices than those of nitrides, sulfides, and carbides whose refractive indices may increase in this order. This however holds true merely in the general case. The refractive indices also vary with the type of elements or the composition ratio of the dielectric material (for instance, the composition ratio between nitride and oxide in the case of oxynitride). Hence, it is desirable to measure the refractive indices of various materials in a film-forming device to be used, and then to decide the materials to be employed. In a preferable example, when the protective layers are to be designed so that n1=2.3 and n2=1.8 with respect to the wavelength of 405 nm, a material containing a sulfide such as, for instance, ZnS as its main component may be used for the first protective layer 1 and a material containing an oxide such as, for instance, ZrSiO$_4$ as its main component may be used for the second protective layer 3. More specifically, it is preferable that ZnS—SiO$_2$ is used for the first protective layer 1 and ZrSiO$_4$—LaF$_3$ is used for the second protective layer 3, since considerably lower thermal conductivity can be obtained in this case as described later.

Preferably, materials whose thermal conductivity is as low as possible are used for the first protective layer 1 and the second protective layer 3. This can prevent the thermal interference from occurring between adjacent signals when signals are recorded in the recording layer 2, and therefore a favorable jitter value can be obtained. Particularly, the second protective layer 3 located on the refractive layer 4 side with respect to the recording layer 2 serves to thermally isolate the recording layer 2 from the reflective layer 4. Hence, it is preferable that the second protective layer 3 is formed using a material with a lower thermal conductivity. In this case, a more favorable jitter value can be obtained. The material with a lower thermal conductivity may be obtained as follows. That is, at least two types of dielectric materials are mixed together, and the materials and the composition ratio thereof are selected so that a more complex configuration is provided for the material to be obtained. Accordingly, it is preferable that the first and second protective layers 1 and 3 or particularly the second protective layer 3 is formed of a mixture containing at least two types of dielectric materials.

Furthermore, it is preferable that the second protective layer 3 contains an oxide or a fluoride. In this case, not only the preferable range of the refractive indices described above can be satisfied readily but also a relatively low thermal conductivity can be obtained. Consequently, in order to prevent the thermal interference from occurring between adjacent signals, it is preferable that the second protective layer 3 contains an oxide or a fluoride.

The preferable thickness of the first protective layer 1 and the second protective layer 3 varies with their materials. The preferable thickness is, for example, in the range of 3 nm to 100 nm when using a laser beam with a blue wavelength and in the range of 3 nm to 200 nm, more preferably in the range of 3 nm to 100 nm when using a laser beam with a red wavelength.

When a material containing Ag is used for the reflective layer 4, it is preferable that a material free from sulfur or sulfide (i.e. a material free from elemental sulfur (S)) is used for the second protective layer 3 that is brought into contact with the reflective layer 4. This is because the reaction between Ag and S tends to cause corrosion. Hence, when a material containing Ag is used for the reflective layer 4, it is preferable that a material free from sulfur or sulfide is used for the layer that is brought into contact with the reflective layer 4 to avoid corrosion.

The present invention is not limited to the configuration shown in FIG. 1. The present invention can be used for various configurations as long as they include at least protective layers on the laser beam incident side and the side opposite thereto with respect to the recording layer 2. Examples of the configuration include one that does not include the reflective layer 4 or one that includes two different layers provided on the laser beam incident side and the side opposite thereto with respect to the reflective layer 4, respectively. Furthermore, an optical information recording medium may have a multilayer structure including N information layers (where N denotes an integer of 2 or larger) stacked together. When a plurality of information layers are provided as in this case, at least one information layer (preferably the one located closest to the laser beam source) is formed to have a configuration including the first protective layer 1, the recording layer 2, and the second protective layer 3 that are provided sequentially from the side close to the substrate. The other information layers may include a recording layer having a composition that is different from that of the recording layer 2. They may include a recording layer of not only the write-once type but also a rewritable or read-only type. When a rewritable information layer or a read-only information layer is used for at least one of the N information layers, information that is not to be erased once it is recorded and that to be rewritten or that for read only can coexist in one medium. Accordingly, media that are very convenient and can be used for various applications can be provided. The present invention can be used for other various configurations. Examples of optical information recording media including a plurality of information layers are described below with reference to the drawings.

Figure 5:
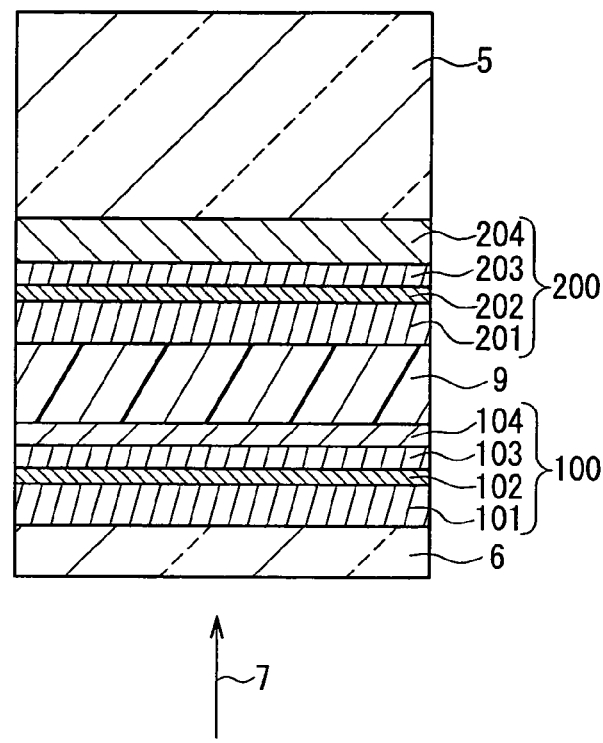
FIG. 5 is a cross-sectional view showing another embodiment of an optical information recording medium according to the present invention.

FIG. 5 shows an example of optical information recording media including two information layers stacked therein. In this optical information recording medium, a first information layer 100, an intermediate layer 9, and a second information layer 200 are provided sequentially from the laser beam incident side between a substrate 5 and an optically transparent layer 6. The first information layer 100 is composed of a first protective layer 101, a recording layer 102, a second protective layer 103, and a reflective layer 104 that are located sequentially from the laser beam incident side. The second information layer 200 is composed of a first protective layer 201, a recording layer 202, a second protective layer 203, and a reflective layer 204 that are located sequentially from the laser beam incident side. In this configuration example, the optical information recording medium is irradiated with a laser beam 7 from one direction. This allows information to be recorded and reproduced with respect to both the first information layer 100 and the second information layer 200. Hence, the first information layer 100 must have optical transparency. On the other hand, since recording in the second information layer 200 is performed with the light that has passed through the first information layer 100, it is preferable that the second information layer 200 is designed to have high recording sensitivity.

The intermediate layer 9 is provided for optically isolating the first information layer 100 and the second information layer 200 from each other. The intermediate layer 9 is formed of a material having transparency with respect to the laser beam 7, such as, for example, an ultraviolet curable resin. It is advantageous that the intermediate layer 9 has a thickness that allows the information layers 100 and 200 to be optically separated from each other and that allows the two information layers 100 and 200 to be located in the region within which an objective lens can focus the laser beam.

For instance, when the configuration of the information layer 8 shown in FIG. 1 is used for the first information layer 100, the refractive index n1 of the first protective layer 101 at the wavelength of the laser beam 7 is set to be higher than the refractive index n2 of the second protective layer 103 at the wavelength of the laser beam 7. Specific values of the refractive indices and examples of the materials to be used are the same as those employed in the example shown in FIG. 1. Thus, it is possible that the recording layer 102 has a high optical absorptance and a large signal amplitude is obtained while a sufficiently high transmittance is maintained. Accordingly, a favorable jitter value can be obtained.

It is preferable that the first information layer 100 is designed so as to have a transmittance of at least 50% in the as-depo state. This makes it possible to obtain high recording sensitivity of the second information layer 200 and a favorable jitter value.

Preferably, the variation in transmittance of the first information layer 100 that is caused between before and after signals are recorded is small. For example, it is preferable that the variation in transmittance is 10% or less. In this case, the amplitude of signals reproduced from the second information layer 200 can be obtained reliably irrespective of whether information has been recorded in the first information layer 100. Accordingly, tracking can be carried out reliably.

Preferably, the recording layer 102 of the first information layer 100 has a thickness of 3 nm to 25 nm. This is because when the first information layer 100 is formed with the recording layer 102 being thicker than 25 nm, it becomes slightly difficult to obtain a sufficiently high transmittance.

FIG. 5 shows the configuration in which the first information layer 100 includes the reflective layer 104. However, various configurations such as one in which the first information layer 100 does not include the reflective layer 104 or one in which the first protective layer 103 or the second protective layer 203 is composed of two layers can be used as long as they are within the range of the present invention.

The configuration of the second information layer 200 also is not limited to that shown in FIG. 5.

Figure 7:
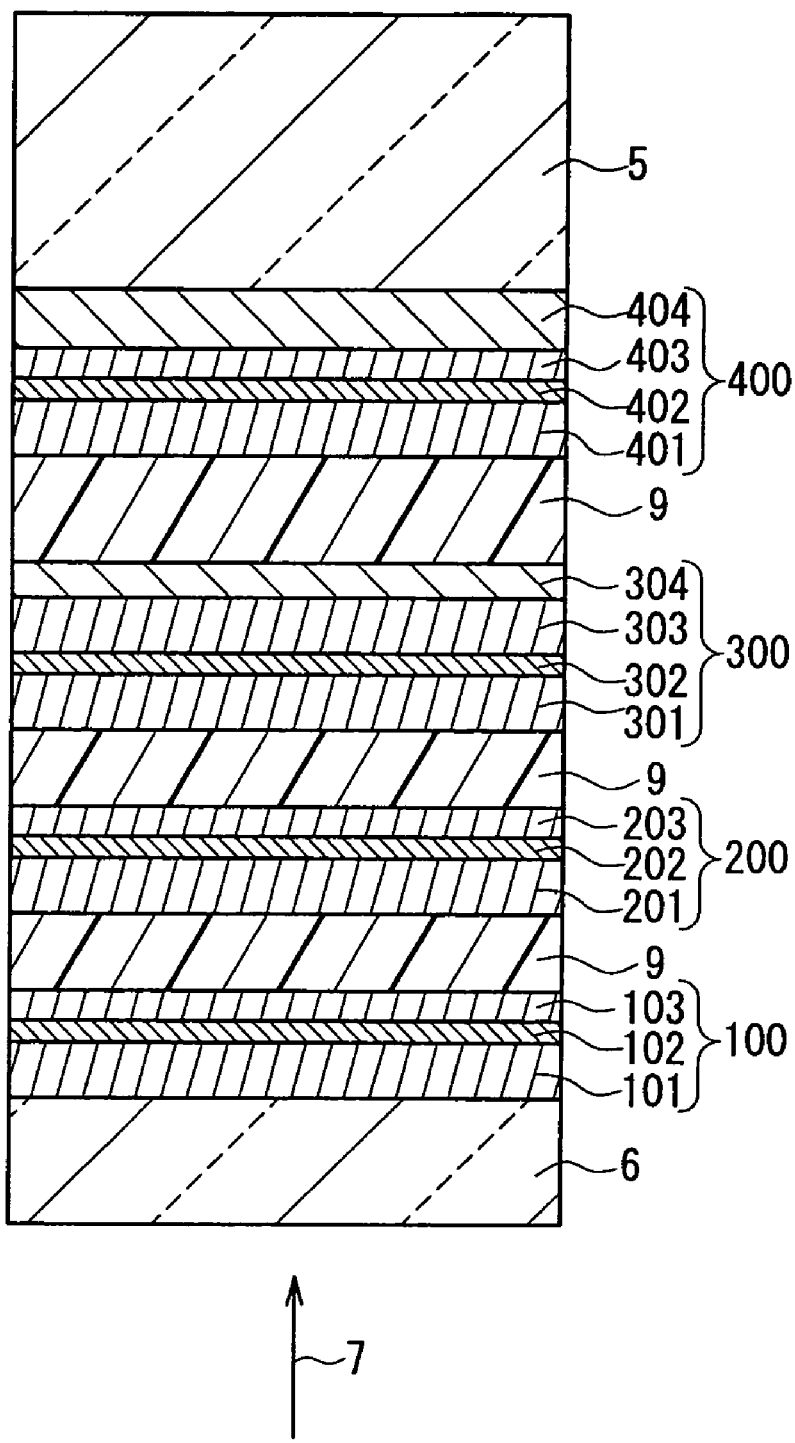
FIG. 7 is a cross-sectional view showing still another embodiment of an optical information recording medium according to the present invention.

FIG. 7 shows an example of optical information recording media including four information layers stacked therein, as another example including a plurality of information layers. This optical information recording medium includes a first information layer 100, a second information layer 200, a third information layer 300, and a fourth information layer 400 that are provided sequentially from the laser beam incident side between a substrate 5 and an optically transparent layer 6. Intermediate layers 9 each are provided between the respective information layers. In the configuration example shown in FIG. 7, the first information layer 100 and the second information layer 200 each are formed of a first protective layer 101, 201, a recording layer 102, 202, and a second protective layer 103, 203 that are provided sequentially from the laser beam incident side. The third information layer 300 and the fourth information layer 400 each are formed of a first protective layer 301, 401, a recording layer 302, 402, a second protective layer 303, 403, and a reflective layer 304, 404 that are provided sequentially from the laser beam incident side. In this configuration example, the optical information recording medium is irradiated with a laser beam 7 from one direction as in the example described earlier and thereby information is recorded and reproduced with respect to the first to fourth information layers 100, 200, 300, and 400. Hence, at least the first information layer 100 that is located closest to the laser beam incident side must be optically transparent. Accordingly, as in the configuration shown in FIG. 5, at least the first information layer 100 is formed so that the refractive index n1 of the first protective layer 101 and the refractive index n2 of the second protective layer 103 at the wavelength of the laser beam 7 satisfy the relationship of n2<n1. On the other hand, since recording in the fourth information layer 400 located furthest from the laser beam incident side is performed with the light that has passed through the first to third information layers 100, 200, and 300, it is preferable that the fourth information layer 400 is designed to have high recording sensitivity.

Furthermore, when at least three information layers are stacked together, it is necessary to design the information layers so that the closer to the laser beam incident side the information layer is located, the higher its transmittance is. Hence, when four information layers are stacked as shown in FIG. 7, it is necessary to design the information layers so that the first to third information layers 100, 200, and 300 located on the laser beam incident side have transmittances that decrease sequentially, for instance, 80%, 70%, and 70%, or 80%, 70%, and 60%, respectively.

The following description is directed to a method of manufacturing the optical information recording media described above. Examples of the methods of producing a multilayer film that is included in the optical information recording media can include a sputtering method, a vacuum deposition method, and a CVD (Chemical Vapor Deposition) method. Gas that is used for forming the film (hereinafter referred to as a "film forming gas") may be any gas that allows the film to be formed, for example, a rare gas such as Ar, Kr, etc. When the film is formed using, for instance, an oxide or a nitride, it also is possible to carry out a reactive film formation using a gas containing a trace amount of, for instance, oxygen or nitrogen mixed therein as required. For instance, when the recording layer 2 of the optical information recording medium shown in FIG. 1 is formed of a material containing an oxide as its main component, preferably a gas containing a mixed gas of a rare gas and oxygen as its main component is used as the film forming gas and thereby reactive sputtering is carried out. This allows a recording layer having excellent film quality to be produced readily. In this step, the composition ratio of oxygen contained in the recording layer 2 is varied through the change in flow ratio of the rare gas and oxygen, and thereby the flow ratio of the respective gases may be determined to allow excellent disk characteristics to be obtained.

Furthermore, a protective coat further may be provided between the optically transparent layer 6 and the information layer. The following description is directed to steps for producing the protective coat between the first protective layer 1 and the optically transparent layer 6 of the optical information recording medium shown in FIG. 1. For instance, as shown in FIG. 1, after a multilayer film (the information layer 8) including the layers 1 to 4 is formed on the substrate 5 by sputtering, the substrate 5 with the information layer 8 formed thereon is taken out of a sputtering device. Subsequently, an ultraviolet curable resin is applied to the surface of the first protective layer 1 as the protective coat by, for instance, spin coating. This then is irradiated with ultraviolet rays from the side of the surface to which the ultraviolet curable resin has been applied and thereby this resin is cured. Thus, the protective coat is formed and thereby the steps of forming the protective coat are completed. The ultraviolet irradiation that is carried out in the step described above may be performed using any one of a DC lamp and a flash lamp.

Figure 6:
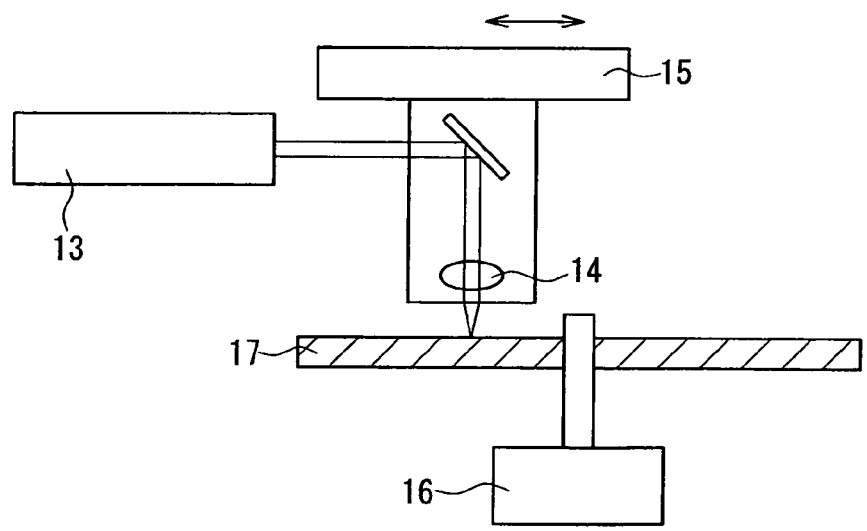
FIG. 6 is a schematic view showing an example of a recording/reproducing device used in recording and reproducing information with respect to optical information recording media of the present invention.

The following description is directed to an example of the methods of recording and reproducing information with respect to an optical information recording medium formed as described above. FIG. 6 shows a schematic view of an example of a device to be used for information recording and reproduction (a recording/reproducing device) when the optical information recording medium is an optical disk. In order to record, reproduce, and erase signals, the recording/reproducing device includes: a laser beam source 13; an optical head with an objective lens 14; a drive 15 for leading a laser beam to a predetermined position to be irradiated; a tracking control unit and a focusing control unit (not shown in FIG. 6) for controlling the position of the optical information recording medium 17 with respect to the track direction and the direction perpendicular to the film surface; a laser drive (not shown in FIG. 6) for modulating laser power; and a rotation control unit 16 for rotating the optical information recording medium 17.

The signal recording, erasure, and reproduction are carried out as follows. That is, first, the optical information recording medium 17 is rotated with the rotation control unit 16, and then the optical information recording medium 17 is irradiated with a laser beam, with the laser beam being focused on a minute spot through the optical system. In the signal reproduction, the optical information recording medium 17 is irradiated with a laser beam and signals obtained thereby from the medium are read by a detector. In this case, the power of the laser beam to be used for the signal reproduction is lower than that to be used for signal recording or erasure, and the laser beam irradiation at that power does not affect the optical state of recorded marks and allows a sufficient amount of light for reproducing the recorded marks from the optical information recording medium 17 to be obtained.

EXAMPLES

In the following, the present invention is described further in detail using specific examples. However, the examples do not limit the present invention.

Example 1

In Example 1, an optical information recording medium was produced that had a configuration shown in FIG. 1. A disc-like polycarbonate plate was used as the substrate 5. The disc-like polycarbonate plate had a thickness of 1.1 mm and a diameter of 120 mm. It had a spiral groove formed on a surface thereof. The spiral groove had a width of 0.25 µm, a pitch of 0.32 µm, and a depth of 20 nm. A mixture of 80 mol % of ZnS and 20 mol % of $SiO_2$ (hereinafter referred to as "$(ZnS)_{80}(SiO_2)_{20}$ (mol %)", and the same applies to other mixtures) was used for the first protective layer 1. A mixture, $(ZrSiO_4)_{90}(Cr_2O_3)_{10}$ (mol %) was used for the second protective layer 3. A mixture, $Al_{98}Cr_2$ (atomic %) was used for the reflective layer 4. A mixture, $Te_{43}O_{50}Pd_7$ (atomic %) was used for the recording layer 2. The first protective layer 1 and the second protective layer 3 had a thickness of 6 nm and a thickness of 17 nm, respectively. The reflective layer 4 and the recording layer 2 had a thickness of 40 nm and a thickness of 20 nm, respectively. The respective layers were formed on the substrate 5 sequentially from the reflective layer 4 to the first protective layer 1 using the sputtering method. In the last step, a 90-µm thick sheet made of polycarbonate resin was bonded to the first protective layer 1 with an ultraviolet curable resin, and the sheet and the ultraviolet curable resin as a whole were used as the optically transparent layer 6. Thus, the optical information recording medium according to the present example was formed.

The first protective layer 1 and the second protective layer 3 each were formed as follows. That is, Ar gas was supplied to result in a total pressure of 0.13 Pa, and a power of 5.10 $W/cm^2$ was applied to a cathode using a high frequency (RF) power source. The formation of the reflective layer 4 was carried out by supplying Ar gas to result in a total pressure of 0.13 Pa and applying a power of 4.45 $W/cm^2$ using a direct current (DC) power source. The formation of the recording layer 2 was carried out by supplying a mixed gas of Ar and oxygen whose flow ratio was 1:1.1 to result in a total pressure of 0.13 Pa and applying a power of 1.27 $W/cm^2$ to the cathode using the DC power source. For the formation of the recording layer 2, TePd was used as a target. The optical information recording medium thus produced was referred to as a "medium (1)".

A laser beam with a wavelength of 405 nm and an objective lens with a numerical aperture of 0.85 were used for recording and reproducing signals. The signal modulation was carried out by 1–7PP modulation. The length of a 2T mark was 0.160 µm, and the disk rotational speed was a linear velocity of 5.28 m/s. The characteristics of the disk were evaluated as follows. That is, single signals of the 2T mark were recorded in the groove region with a suitable laser power and then the C/N ratio of signals obtained was measured. In this connection, the groove region is defined as tracks that are located closer to the laser beam incident side of tracks formed of convexities and concavities in the substrate 5.

In addition, a medium (100) was produced as a comparative example. The medium (100) was identical with the medium (1) except that $(ZnS)_{80}(SiO_2)_{20}$ (mol %) was used for both the first protective layer 1 and the second protective layer 3, and their thickness was adjusted so as to allow the optical path length to be the same as that used for the medium (1). Table 1 shows results of the evaluations of the medium (1) and medium (100), materials used for the first and second protective layers 1 and 3, and refractive indices n1 and n2 of the first and second protective layers at the laser beam wavelength of 405 nm.

TABLE 1

| Medium No. | First Protective Layer 1 | | Second Protective Layer 3 | | C/N Ratio |
|---|---|---|---|---|---|
| | Material (mol %) | Refractive Index n1 | Material (mol %) | Refractive Index n2 | |
| (1) | $(ZnS)_{80}(SiO_2)_{20}$ | 2.3 | $(ZrSiO_4)_{90}(Cr_2O_3)_{10}$ | 1.9 | o |
| (100) | $(ZnS)_{80}(SiO_2)_{20}$ | 2.3 | $(ZnS)_{80}(SiO_2)_{20}$ | 2.3 | x |

With respect to the C/N ratio mentioned in Table 1, "O" denotes at least 50 dB and "x" indicates less than 50 dB. According to Table 1, the C/N ratio of the 2T mark obtained in the medium (1) was improved as compared to that in the medium (100) used as the comparative example. With respect to the medium (1) and the medium (100), optical calculations were carried out by the same method as that described in the embodiment. As a result, the difference in reflectance ΔR that was obtained by comparing the reflectance in the recorded state with that in the unrecorded state was 16% in the medium (100) and 19% in the medium (1). Furthermore, the reflectance Rc obtained when the recording layer 2 was in the recorded state was 1% in both the medium (1) and the medium (100), which was obtained by calculation. Consequently, it can be understood that advantageous values of both the modulation factor and the difference in reflectance are obtained in the medium (1) as compared to the medium (100). Conceivably, since the refractive index n2 of the second protective layer 3 is smaller than the refractive index n1 of the first protective layer 1 in the medium (1), the medium (1) satisfies the condition that allows multiple reflection of light to occur readily in the recording layer 2, which results in a larger signal amplitude.

Furthermore, other media were produced. In these media, instead of $(ZrSiO_4)_{90}(Cr_2O_3)_{10}$ (mol %), $(ZrSiO_4)_{30}(Cr_2O_3)_{40}(LaF_3)_{30}$ (mol %), $ZrSiO_4$, $(Al_2O_3)_{20}(SiO_2)_{30}(Cr_2O_3)_{50}$ (mol %), and $(Al_2O_3)_{10}(SiO_2)_{30}(Cr_2O_3)_{30}(LaF_3)_{30}$ (mol %) were used for the second protective layer 3. The thickness of the second protective layer 3 was adjusted so as to allow the optical path length to be the same as that in the second protective layer 3 of the medium (1). In these media, the refractive index n2 of the second protective layer 3 is smaller than the refractive index n1 of the first protective layer 1 as in the medium (1). With respect to these media, the same effect of improving the C/N ratio as that shown in Table 1 was obtained. In addition, even when the composition ratio of various dielectrics used for the second protective layer 3 was changed within the range that allows the relationship of n1>n2 to be satisfied, the same effect as that shown in Table 1 was obtained.

Still other media were produced that were identical with the medium (1) except for the following. The first protective layers 1 of the media were formed of ZnS, $(ZnS)_{80}Si_{20}$ (mol %), $(ZnS)_{80}(Si—O)_{20}$ (mol %), $(ZnS)_{80}(Si—O)_{20}$ (mol %), $(SnO_2)_{70}(SiO_2)_{30}$ (mol %), and $(Cr_2O_3)_{60}(SiO_2)_{40}$ (mol %), respectively. The second protective layers 3 of the media were formed of $(ZrSiO_4)_{90}(Cr_2O_3)_{10}$ (mol %), $(Al_2O_3)_{20}(SiO_2)_{30}(Cr_2O_3)_{50}$ (mol %), $(ZnS)_{80}(SiO_2)_{20}$ (mol %), $LaF_3$, $(SiO_2)_{50}(LaF_3)_{50}$ (mol %), and $(ZnO)_{60}(SiO_2)_{40}$ (mol %), respectively. Each thickness of the first and second protective layers 1 and 3 was adjusted so as to allow the optical path length to be the same as that obtained with respect to each protective layer of the medium (1). These media are referred to as "media (2) to (7)", respectively. Table 2 shows materials used for the first and second protective layers 1 and 3 and refractive indices n1 and n2 of the first and second protective layers 1 and 3 obtained with respect to the laser beam having a wavelength of 405 nm in the media (2) to (7). As shown in Table 2, the refractive index n2 of the second protective layer 3 is smaller than the refractive index n1 of the first protective layer 1 in all the media (2) to (7). In addition, Table 2 also shows results of the evaluation of the media (2) to (7) made in the same manner as in the medium (1).

TABLE 2

| Medium No. | First Protective Layer 1 | | Second Protective Layer 3 | | C/N Ratio |
|---|---|---|---|---|---|
| | Material (mol %) | RI n1 | Material (mol %) | RI n2 | |
| (2) | ZnS | 2.6 | $(ZrSiO_4)_{90}(Cr_2O_3)_{10}$ | 1.9 | o |
| (3) | $(ZnS)_{80}Si_{20}$ | 2.6 | $(Al_2O_3)_{20}(SiO_2)_{30}(Cr_2O_3)_{50}$ | 1.8 | o |
| (4) | $(ZnS)_{80}(Si—O)_{20}$ | 2.5 | $(ZnS)_{80}(SiO_2)_{20}$ | 2.3 | o |
| (5) | $(ZnS)_{80}(Si—O)_{20}$ | 2.5 | $LaF_3$ | 1.8 | o |
| (6) | $(SnO_2)_{70}(SiO_2)_{30}$ | 2.4 | $(SiO_2)_{50}(LaF_3)_{50}$ | 1.7 | o |
| (7) | $(Cr_2O_3)_{60}(SiO_2)_{40}$ | 2.3 | $(ZnO)_{60}(SiO_2)_{40}$ | 1.9 | o |

* In Table 2, "RI" denotes a refractive index.

According to Table 2, the C/N ratio of the 2T mark obtained in each of the media (2) to (7) was improved as compared to that obtained in the medium (100) used as the comparative example. Conceivably, the same effect as that obtained in the medium (1) allowed the signal amplitude to increase in the media (2) to (7) as in the case of the medium (1).

Furthermore, random signals having a mark length of 2T to 9T were recorded on each of the media (1) to (7) in which excellent C/N ratio was obtained, and a jitter value of each of media (1) to (7) was measured. In each of the media (1) to (7), an excellent jitter value of not more than 6.5% was obtained, and the media (1) to (7) satisfied standard value.

Furthermore, the inventors produced media in which various dielectric materials were used for the first protective layer 1 and the second protective layer 3, and then carried out experiments for evaluating their characteristics. As a result, it was found that when the refractive index n1 of the first protective layer 1 was larger than the refractive index n2 of the second protective layer 3, a more favorable effect of improving the C/N ratio was obtained as compared to the case where the first and second protective layers 1 and 3 were formed of the same material. Moreover, the same effect of improving the C/N ratio as that obtained in the media (1) to (7) was obtained when Te—O—M was used for the recording layer 2, wherein M denotes Au, Pt, Ag, Cu, Sb, Bi, Ge, Sn, In, Ti, Zr, Hf, Cr, Mo, W, Co, Ni, or Zn. Furthermore, the same result as that obtained in the media (1) to (7) was obtained when Sb—O, Sn—O, In—O, Ge—O, Mo—O, W—O, Zn—O, or Ti—O was used for the recording layer 2.

With the above, it was confirmed that when the refractive index n1 of the first protective layer 1 that was located on the laser beam incident side with respect to the recording layer 2 was higher than the refractive index n2 of the second protective layer 3 that was located on the opposite side to the laser beam incident side with respect to the recording layer 2, a high C/N ratio was obtained under the condition for achieving considerably high density recording even if a simple layer configuration was employed.

Example 2

An optical information recording medium having a configuration shown in FIG. 5 was produced as another example. The substrate 5 shown in FIG. 5 was the same as that of the medium (1) described in Example 1. The reflective layers 104 and 204 were formed of Ag—Pd—Cu and Al—Cr, respectively. The recording layers 102 and 202 were formed of $Te_{50}O_{25}Pd_{25}$ (atomic %) and $(Te_{50}O_{25}Pd_{25})_{95}(SiO_2)_5$ (mol %), respectively. All the first protective layers 101 and 201 and the second protective layer 203 were formed of $(ZnS)_{80}(SiO_2)_{20}$ (mol %). The second protective layer 103 was formed of $(ZrSiO_4)_{30}(Cr_2O_3)_{40}(LaF_3)_{30}$ (mol %). The refractive index of the $(ZrSiO_4)_{30}(Cr_2O_3)_{40}(LaF_3)_{30}$ (mol %) at the wavelength of 405 nm is 2.0, which is smaller than the refractive index of the $(ZnS)_{80}(SiO_2)_{20}$ (mol %), namely 2.3. That is, the first information layer 100 employed the configuration of the information layer of the optical information recording medium according to the present invention.

Thickness of the respective layers was determined as follows. That is, the range that satisfied conditions under which the reflectance and signal amplitude of one of the two information layers were approximately equal to those of the other was determined by the optical design, and then the thickness was determined within the range so that a sufficiently high transmittance of the first information layer 100 and high recording sensitivity of the second information layer 200 were obtained. Specifically, the first protective layer 101, the second protective layer 103, the first protective layer 201, and the second protective layer 203 were 33 nm, 17 nm, 9 nm, and 17 nm, respectively. The reflective layers 104 and 204 were 10 nm and 40 nm, respectively while the recording layers 102 and 202 were 10 nm and 20 nm, respectively. The optically transparent layer 6 and the intermediate layer 9 were 75 μm and 25 μm, respectively, in all the media produced in this example.

The optical information recording medium of the present example was produced by the following procedure. The respective layers of the second information layer 200 were formed on the grooved surface of the substrate 5 sequentially from the reflective layer 204 to the first protective layer 201. Subsequently, an ultraviolet curable resin was applied thereto as the intermediate layer 9 and the same groove as that of the substrate 5 was formed at its surface by printing. Thereafter, the respective layers of the first information layer 100 were formed sequentially from the reflective layer 104 to the first protective layer 101. At the last step, a sheet made of polycarbonate was bonded to the first protective layer 101 with an ultraviolet curable resin. The sheet and the ultraviolet curable resin as a whole were used as the optically transparent layer 6. Thus, the optical information recording medium (8) was obtained. In addition, media (101) and (102) also were produced as comparative examples. The medium (101) was the same as the medium (8) except that $(ZnS)_{80}(SiO_2)_{20}$ (mol %) was used for both the first and second protective layers 101 and 103. The medium (102) was the same as the medium (8) except that $(ZrSiO_4)_{30}(Cr_2O_3)_{40}(LaF_3)_{30}$ (mol %) was used for the first protective layer 101 and $(ZnS)_{80}(SiO_2)_{20}$ (mol %) was used for the second protective layer 103. The disks thus produced were evaluated as follows. That is, 2T marks were recorded in the first information layer 100 and the second information layer 200 with a suitable laser power and then their C/N ratio was measured. Table 3 shows results of the evaluations of the media (8), (101) and (102) that were carried out under the same evaluation conditions as those employed for the evaluations of the medium (1) in Example 1. Table 3 also shows refractive indices n1 and n2 of the first and second protective layers 101 and 103 at the wavelength of 405 nm.

TABLE 3

| Medium No. | First Protective Layer 101 | | Second Protective Layer 103 | | C/N Ratio | |
|---|---|---|---|---|---|---|
| | Material (mol %) | RI n1 | Material (mol %) | RI n2 | 1st IL | 2nd IL |
| (8) | $(ZnS)_{80}(SiO_2)_{20}$ | 2.3 | $(ZrSiO_4)_{30}(Cr_2O_3)_{40}(LaF_3)_{30}$ | 2.0 | ○ | ○ |
| (101) | $(ZrSiO_4)_{30}(Cr_2O_3)_{40}(LaF_3)_{30}$ | 2.0 | $(ZnS)_{80}(SiO_2)_{20}$ | 2.3 | x | ○ |
| (102) | $(ZnS)_{80}(SiO_2)_{20}$ | 2.3 | $(ZnS)_{80}(SiO_2)_{20}$ | 2.3 | ○ | x |

* In Table 3, "RI" denotes a refractive index.
* In Table 3, "1st IL" denotes the first information layer and "2nd IL" indicates the second information layer.

With respect to the C/N ratio mentioned in Table 3, "O" denotes at least 45 dB and "x" indicates less than 45 dB. According to Table 3, both the first and second protective layers of the medium (8) had favorable C/N ratios as compared to those of the media (101) and (102) produced as the comparative examples. In the medium (101), since the relationship of n1<n2 was satisfied, the C/N ratio of the first information layer 100 was not high but that of the second information layer 200 was high because the first information layer 100 had a high transmittance, specifically at least 50%. In the medium (102), the C/N ratio of the first information layer 100 was high but that of the second information layer 200 was not high because the first information layer 100 did not have a sufficiently high transmittance (specifically, less than 50%). On the other hand, in the medium (8) that satisfied the relationship of n1>n2, the first information layer 100 had both a high transmittance, specifically at least 50%, and a high C/N ratio, namely at least 45 dB. Consequently, the first and second information layers 100 and 200 both had favorable C/N ratios.

Furthermore, random signals having a mark length of 2T to 9T were recorded in each of the first information layer 100 and the second information layer 200 of the medium (8) in which excellent C/N ratio was obtained, and a jitter value of each of the first information layer 100 and the second information layer 200 was measured. In the first information layer 100, an excellent jitter value of not more than 8.5% was obtained. In the second information layer 200, an excellent jitter value of not more than 6.5% was obtained. The first information layer 100 and the second information layer 200 satisfied standard value.

Example 3

An optical information recording medium having four information layers shown in FIG. 7 was produced as another example.

First, the procedure for producing the optical information recording medium of the present example is described. The respective layers of the fourth information layer 400 were formed on the grooved surface of the substrate 5 sequentially from the reflective layer 404 to the first protective layer 401. Subsequently, an ultraviolet curable resin was applied thereto as the intermediate layer 9 and the same groove as that of the substrate 5 was formed at its surface by printing. Thereafter, the respective layers of the third information layer 300 were formed on the grooved surface of the intermediate layer 9 sequentially from the reflective layer 304 to the first protective layer 301. Then an ultraviolet curable resin was applied thereto as the intermediate layer 9 and the same groove as that of the substrate 5 was formed at its surface by printing. Subsequently, the respective layers of the second information layer 200 were formed on the grooved surface of that intermediate layer 9 sequentially from the second protective layer 203 to the first protective layer 201. Thereafter, an ultraviolet curable resin was applied thereto as the intermediate layer 9 and the same groove as that of the substrate 5 was formed at its surface by printing. Subsequently, the respective layers of the first information layer 100 were formed on the grooved surface of that intermediate layer 9 sequentially from the second protective layer 103 to the first protective layer 101. Thereafter, a protective coat formed of an ultraviolet curable resin was provided and a sheet made of polycarbonate was bonded thereto with an ultraviolet curable resin, which as a whole was used as the optically transparent layer 6.

The following description is directed to detailed methods of producing the first to fourth information layers 100 to 400.

A disc-like polycarbonate plate was used as the substrate 5. The disc-like polycarbonate plate had a diameter of 120 mm and a thickness of 1.1 mm. It had tracks formed of concavities and convexities at its surface on which the reflective layer 404 was to be formed. The tracks had a depth of 20 nm and a track pitch (the distance between two adjacent grooves) of 0.32 μm. An $Al_{98}Cr_2$ (atomic %) film with a thickness of 40 nm was formed as the reflective layer 404 in an Ar gas environment by DC sputtering. Subsequently, a $(ZnS)_{80}(SiO_2)_{20}$ (mol %) film with a thickness of 22 nm was formed as the second protective layer 403 in the Ar gas environment by RF sputtering. A Te—O—Pd film with a thickness of 20 nm then was formed as the recording layer 402. Specifically, a sputtering target of $Te_{80}Pd_{20}$ (atomic %) was formed, by the DC sputtering, in an atmosphere in which the total pressure of a mixed gas of Ar gas (with a flow rate of $4.2\times10^{-7}$ m³/s (25 sccm)) and oxygen gas (with a flow rate of $4.3\times10^{-7}$ m³/s (26 sccm)) was set at 0.13 Pa. Thereafter, a $(ZnS)80(SiO_2)_{20}$ (mol %) film with a thickness of 11 nm was formed as the first protective layer 401 in the Ar gas environment by the RF sputtering. Thus the fourth information layer 400 was produced.

Subsequently, an intermediate layer 9 with a thickness of 17 μm was formed. Next, a Ag—Pd—Cu film with a thickness of 10 nm was formed as the reflective layer 304 on the grooved surface of the intermediate layer 9. The reflective layer 304 was formed in the Ar gas environment by the DC sputtering. Thereafter, a $(ZrSiO_4)_{30}(Cr_2O_3)_{40}(LaF_3)_{30}$ (mol %) with a thickness of 25 nm was formed as the second protective layer 303. It was formed in the Ar gas environment by the RF sputtering. Next, a Te—O—Pd film with a thickness of 8nm was formed as the recording layer 302. Specifically, a sputtering target of $Te_{80}Pd_{20}$ (atomic %) was formed, by the DC sputtering, in an atmosphere in which the total pressure of a mixed gas of Ar gas (with a flow rate of $4.2\times10^{-7}$ m³/s (25 sccm)) and oxygen gas (with a flow rate of $4.0\times10^{-7}$ m³/s (24 sccm)) was set at 0.13 Pa. Subsequently, a $(ZnS)_{80}(SiO_2)_{20}$ (mol %) film with a thickness of 17 nm was formed as the first protective layer 301 in the Ar gas environment by the RF sputtering. Thus the third information layer 300 was produced.

The refractive index n1 of the first protective layer 301 that was located on the laser beam incident side with respect to the recording layer 302 was 2.3 while the refractive index n2 of the second protective layer 303 that was located on the opposite side to the laser beam incident side with respect to the recording layer 302 was 2.01. Accordingly, the refractive indices n1 and n2 of the first and second protective layers 301 and 303 of the third information layer 300 satisfied the relationships of n2<n1, 2.0<n1, and 0.2<(n1−n2).

Subsequently, an intermediate layer 9 with a thickness of 15 μm was formed. Next, a $(Cr_2O_3)_{50}(SiO_2)_{50}$ (mol %) film with a thickness of 12 nm was formed as the second protective layer 203 on the grooved surface of that intermediate layer 9. It was formed in the Ar gas environment by the RF sputtering. Then a Te—O—Pd film with a thickness of 10 nm was formed as the recording layer 202. Specifically, a sputtering target of $Te_{80}Pd_{20}$ (atomic %) was formed, by the DC sputtering, in an atmosphere in which the total pressure of a mixed gas of Ar gas (with a flow rate of $4.2\times10^{-7}$ m³/s (25 sccm)) and oxygen gas (with a flow rate of $3.7\times10^{-7}$ m³/s (22 sccm)) was set at 0.13 Pa. Subsequently, a $(SnO_2)_{80}(Ga_2O_3)_{20}$ (mol %) film with a thickness of 26 nm was formed as the first protective layer 201 in the Ar gas environment by the RF sputtering. Thus the second information layer 200 was produced.

The refractive index n1 of the first protective layer 201 that was located on the laser beam incident side with respect to the recording layer 202 was 2.42 while the refractive index n2 of the second protective layer 203 that was located on the opposite side to the laser beam incident side with respect to the recording layer 202 was 2.20. Accordingly, the refractive indices n1 and n2 of the first and second protective layers 201 and 203 of the second information layer 200 satisfied the relationships of n2<n1, 2.0<n1, and 0.2<(n1−n2).

Next, an intermediate layer 9 with a thickness of 18 μm was formed. Then a $(Ga_2O_3)_{60}(SiO_2)_{40}$ (mol %) film with a thickness of 21 nm was formed as the second protective layer 103 on the grooved surface of the intermediate layer 9. It was formed in the Ar gas environment by the RF sputtering. Thereafter, a Te—O—Pd film with a thickness of 8 nm was formed as the recording layer 102. Specifically, a sputtering target of $Te_{80}Pd_{20}$ (atomic %) was formed, by the DC sputtering, in an atmosphere in which the total pressure of a mixed gas of Ar gas (with a flow rate of $4.2\times10^{-7}$ m³/s (25 sccm)) and oxygen gas (with a flow rate of $2.7\times10^{-7}$ m³/s (16 sccm)) was set at 0.13 Pa. Subsequently, a $(ZrSiO_4)_{70}(Cr_2O_3)_{30}$ (mol %) film with a thickness of 24 nm was formed as the first protective layer 101 in the Ar gas environment by the RF sputtering. Thus the first information layer 100 was produced.

The refractive index n1 of the first protective layer 101 that was located on the laser beam incident side with respect to the recording layer 102 was 2.15 while the refractive index n2 of the second protective layer 103 that was located on the opposite side to the laser beam incident side with respect to the recording layer 102 was 1.85. Accordingly, the refractive indices n1 and n2 of the first and second protective layers 101 and 103 of the first information layer 100 satisfied the relationships of n2<n1, 2.0<n1, and 0.2<(n1−n2).

Subsequently, the protective coat and the optically transparent layer 6 were formed to have a total thickness of 60 μm. Thus the optical information recording medium (medium (9)) of the present example was produced.

The intermediate layers 9 that were provided between the respective information layers were formed so as to have different thicknesses from each other since interference of stray light might be caused between the respective information layers if they had the same thickness.

The optical constants of the respective recording layers were measured with a spectroscope using samples. The samples each were produced on a quartz substrate under the same film formation conditions as those employed in the steps of forming the recording layers. Measurements of their optical constants in the crystallized state were carried out by the same method after the samples were annealed to a predetermined temperature at which their recording layers were brought into the crystallized state. The values obtained in the recording layer 402 were na=2.5, ka=0.25, nc=2.0, and kc=0.90. Those obtained in the recording layer 302 were na=2.5, ka=0.30, nc=2.0, and kc=1.00. Those obtained in the recording layer 202 were na=2.5, ka=0.38, nc=2.0, and kc=1.10. Those obtained in the recording layer 102 were na=2.5, ka=0.50, nc=2.0, and kc=1.00. In this context, "na" and "ka" denote an refractive index and an extinction coefficient obtained when the recording layers were in the as-depo state (i.e. the state immediately after their formation), while "nc" and "kc" indicate an refractive index and an extinction coefficient obtained when the recording layers were in the crystallized state.

The thickness d(nm) of the respective layers of the present example is expressed by a formula of d=aλ/n (where n denotes the refractive index of the protective layer, a indicates a positive number, and λ denotes the wavelength of light (i.e. 405 nm in this case)). The thickness of the protective layers was designed as follows. That is, the thickness was adjusted to allow all the signals obtained from the respective information layers and levels of their reflectances to be substantially equal to one another, and then the value of "a" was optimized so that within the range that allowed the above-mentioned adjustment to be carried out, the transmittance of the information layers was as high as possible and the difference in transmittance obtained between the recorded state and the unrecorded state was small. The thickness of the respective layers was determined as follows. The thickness of the second protective layer 403 was determined by 51/(n2), that of the first protective layer 401 by 25/(n1), that of the second protective layer 303 by 51/(n2), that of the first protective layer 301 by 38/(n1), that of the second protective layer 203 by 25/(n2), that of the first protective layer 201 by 63/(n1), that of the second protective layer 103 by 38/(n2), and that of the first protective layer 101 by 51/(n1).

Using suitable laser power, 2T marks were recorded in the first information layer 100, the second information layer 200, the third information layer 300, and the fourth information layer 400 of the medium (9) produced by the above-mentioned method, and then their C/N ratios were measured. A laser beam with a wavelength of 405 nm and an objective lens with a numerical aperture of 0.85 were used for recording and reproducing the signals. The signals were recorded with recording densities that allow the information layers to have capacities of approximately 23.3 GB and 25 GB (hereinafter the recording densities are referred to as "23.3 GB recording density and 25 GB recording density", respectively). In the case of the 23.3 GB recording density, the measurement was carried out under the conditions that the 2T mark length was 0.160 μm and the disk rotational speed was a linear velocity of 5.28 m/s as in Example 1. On the other hand, in the case of the 25 GB recording density, the measurement was carried out under the conditions that the 2T mark length was 0.149 μm and the disk rotational speed was a linear velocity of 4.92 m/s.

Tables 4-1 to 4-3 show materials and refractive indices of the respective protective layers of the medium sample (9), optical characteristics of each individual information layer, and the results of judgement on the optical characteristics and C/N ratios of the whole including four information layers staked together. In addition, Tables 4-1 to 4-3 also show the results of evaluations of a medium (103) and a medium (104). Refractive indices of the protective layers included in each information layer of the media (103) and (104) satisfy a relationship of n1=n2 and a relationship of n2>n1, respectively. In this case, the media (103) and (104) were produced in the same manner as that employed for the medium (9) except that the materials of the respective protective layers are different from those used for the medium (9). The materials used for the protective layers of the media (103) and (104) are shown in Table 4-1.

TABLE 4-1

| Medium No. | Relationship between n1 and n2 | IL No. | PL No. | Material of PL (mol %) | RI of PL |
|---|---|---|---|---|---|
| (9) | n2 < n1 | 400 | 403 | $(ZnS)_{80}(SiO_2)_{20}$ | 2.30 |
| | | | 401 | $(ZnS)_{80}(SiO_2)_{20}$ | 2.30 |
| | | 300 | 303 | $(ZrSiO_4)_{30}(Cr_2O_3)_{40}(LaF_3)_{30}$ | 2.01 |
| | | | 301 | $(ZnS)_{80}(SiO_2)_{20}$ | 2.30 |
| | | 200 | 203 | $(Cr_2O_3)_{50}(SiO_2)_{50}$ | 2.20 |
| | | | 201 | $(SnO_2)_{80}(Ga_2O_3)_{20}$ | 2.42 |
| | | 100 | 103 | $(Ga_2O_3)_{60}(SiO_2)_{40}$ | 1.85 |
| | | | 101 | $(ZrSiO_4)_{70}(Cr_2O_3)_{30}$ | 2.15 |
| (103) | n2 = n1 | 400 | 403 | $(ZnS)_{80}(SiO_2)_{20}$ | 2.30 |
| | | | 401 | $(ZnS)_{80}(SiO_2)_{20}$ | 2.30 |
| | | 300 | 303 | $(ZnS)_{80}(SiO_2)_{20}$ | 2.30 |
| | | | 301 | $(ZnS)_{80}(SiO_2)_{20}$ | 2.30 |
| | | 200 | 203 | $(Cr_2O_3)_{50}(SiO_2)_{50}$ | 2.20 |
| | | | 201 | $(Cr_2O_3)_{50}(SiO_2)_{50}$ | 2.20 |
| | | 100 | 103 | $(ZrSiO_4)_{70}(Cr_2O_3)_{30}$ | 2.15 |

TABLE 4-1-continued

| Medium No. | Relationship between n1 and n2 | IL No. | PL No. | Material of PL (mol %) | RI of PL |
|---|---|---|---|---|---|
| | | | 101 | $(ZrSiO_4)_{70}(Cr_2O_3)_{30}$ | 2.15 |
| (104) | n2 > n1 | 400 | 403 | $(ZnS)_{80}(SiO_2)_{20}$ | 2.30 |
| | | | 401 | $(ZnS)_{80}(SiO_2)_{20}$ | 2.30 |
| | | 300 | 303 | $(ZnS)_{80}(SiO_2)_{20}$ | 2.30 |
| | | | 301 | $(ZrSiO_4)_{30}(Cr_2O_3)_{40}(LaF_3)_{30}$ | 2.01 |
| | | 200 | 203 | $(SnO_2)_{80}(Ga_2O_3)_{20}$ | 2.42 |
| | | | 201 | $(Cr_2O_3)_{50}(SiO_2)_{50}$ | 2.20 |
| | | 100 | 103 | $(ZrSiO_4)_{70}(Cr_2O_3)_{30}$ | 2.15 |
| | | | 101 | $(Ga_2O_3)_{60}(SiO_2)_{40}$ | 1.85 |

* In Table 4-1, "RI" denotes a refractive index.
* In Table 4-1, "IL" and "PL" denote the information layer and the protective layer, respectively.

TABLE 4-2

| Medium No. | IL No. | Optical Characteristics of Each Individual IL | | | | | | |
|---|---|---|---|---|---|---|---|---|
| | | Ra(%) | Rc(%) | ΔR(%) | Ta(%) | Tc(%) | (Ta + Tc)/2(%) | (Ta − Tc)/Ta |
| (9) | 400 | 40 | 6 | 34 | 1 | 1 | 1.0 | 0.27 |
| | 300 | 15 | 6 | 9 | 66 | 60 | 62.9 | 0.09 |
| | 200 | 9 | 4 | 6 | 77 | 71 | 74.0 | 0.09 |
| | 100 | 5 | 2 | 3 | 80 | 77 | 78.6 | 0.04 |
| (103) | 400 | 40 | 6 | 34 | 1 | 1 | 1.0 | 0.27 |
| | 300 | 13 | 7 | 6 | 64 | 62 | 62.7 | 0.03 |
| | 200 | 7 | 2 | 5 | 80 | 72 | 75.6 | 0.10 |
| | 100 | 7 | 4 | 3 | 80 | 77 | 78.2 | 0.03 |
| (104) | 400 | 40 | 6 | 34 | 1 | 1 | 1.0 | 0.27 |
| | 300 | 11 | 4 | 7 | 71 | 64 | 67.3 | 0.09 |
| | 200 | 8 | 3 | 5 | 79 | 72 | 75.5 | 0.09 |
| | 100 | 6 | 4 | 2 | 81 | 77 | 79.0 | 0.04 |

* In Table 4-2, "IL" denotes the information layer.

TABLE 4-3

| Medium No. | IL No. | Optical Characteristics of Whole Stacked Layers | | C/N Ratio | |
|---|---|---|---|---|---|
| | | eff. Ra (%) | eff. ΔR (%) | 23.3 GB | 25 GB |
| (9) | 400 | 5.3 | 4.5 | ○ | ○ |
| | 300 | 5.0 | 3.0 | ○ | ○ |
| | 200 | 5.7 | 3.5 | ○ | ○ |
| | 100 | 5.4 | 3.1 | ○ | ○ |
| (103) | 400 | 5.4 | 4.6 | ○ | ○ |
| | 300 | 4.6 | 2.2 | x | x |
| | 200 | 4.3 | 2.9 | ○ | ○ |
| | 100 | 7.3 | 3.2 | ○ | ○ |
| (104) | 400 | 6.4 | 5.4 | ○ | ○ |
| | 300 | 3.9 | 2.4 | x | x |
| | 200 | 4.9 | 3.1 | ○ | ○ |
| | 100 | 6.1 | 2.4 | x | x |

* In Table 4-3, "IL" denotes the information layer.

In Table 4-2, Ra and Rc denote reflectances of each individual information layer that are obtained when the recording layer is in the as-depo state and in the crystallized state, respectively. ΔR denotes the value of Ra-Rc. Ta and Tc denote transmittances of each individual information layer that are obtained when the recording layer is in the as-depo and in the crystallized state, respectively. The measurements of Ra and Rc were carried out with an evaluation drive using samples, each of which included the each individual information layer formed on a substrate. Similarly, the measurements of Ta and Tc were carried out with a spectrometer using samples each of which included the each individual information layer formed on a substrate. The recording layers were brought into the crystallized state through the laser beam irradiation carried out under suitable conditions using an initializing device. In addition, Table 4-2 shows the average ((Ta+Tc)/2) of the transmittances of the recording layers that were obtained in the as-depo state and the crystallized state, respectively. Table 4-2 also shows the rate of change in transmittance ((Ta−Tc)/Ta) that occurred between the recording layer in the as-depo state and that in the crystallized state.

Furthermore, in Table 4-3, "eff. Ra" and "eff. ΔR" denote the reflectance obtained in the as-depo state and the difference between the reflectance obtained in the as-depo state and that obtained in the crystallized state, respectively. The "eff. Ra" and "eff. ΔR" were measured with the evaluation drive while a predetermined information layer was irradiated with a laser beam, with the four information layers being stacked together. As shown in Table 4-3, approximately the same levels of reflectances and differences in reflectance were obtained in the four information layers of the medium sample (9), with the four information layers being stacked together.

In Table 4-3, the evaluation of the C/N ratio is indicated as follows. In the case of the 23.3 GB recording density, "○" denotes at least 48 dB and "x" indicates less than 48 dB. On the other hand, in the case of the 25 GB recording density, "○" denotes at least 45 dB and "x" indicates less than 45 dB.

According to the results shown in Tables 4-1 to 4-3, even when having the 25 GB recording density, all four information layers of the medium (9) had favorable C/N ratios as compared to those of the media (103) and (104). In the medium (103) in which the relationship of n2=n1 was satisfied, the third information layer 300 had small eff. ΔR and C/N ratios that were not sufficiently high. Furthermore, in the medium (104) in which the relationship of n2>n1 was satisfied, the first information layer 100 and the third information layer 300 had small eff. ΔR and C/N ratios that were not sufficiently high.

It was confirmed from the results described above that it was difficult to obtain favorable C/N ratios in all the information layers when the optical information recording medium was designed so that the refractive indices of the first protective layer and the second protective layer satisfied a relationship of n2≧n1 as in the media (103) and (104). On the other hand, when the optical information recording medium was designed so that the refractive indices of the first protective layer and the second protective layer satisfied a relationship of n2<n1 as in, for instance, the medium sample (9), the first to third information layers had high transmittance, specifically at least 50%, and the first to fourth information layers had high C/N ratios, specifically at least 45 dB in the case of the 25 GB recording density. Furthermore, random signals having a mark length of 2T to 9T were recorded in each of the first information layer 100, the second information layer 200, the third information layer 300 and the forth information layer 400 of the medium (9) in which excellent C/N ratio was obtained, and a jitter value of each of the information layers 100, 200, 300 and 400 was measured. The random signals were recorded in the case of the 25 GB recording density. In each of the first to third information layers 100, 200 and 300, an excellent jitter value of about 10% was obtained. In the forth information layer 400, an excellent jitter value of about 8% was obtained. Accordingly, when the first protective layer and the second protective layer of each information layer are designed so that their refractive indices satisfy the relationship of n2<n1 as in the medium sample (9), it is possible to obtain an optical information recording medium having a capacity of 100 GB including four information layers stacked together, with each information layer allowing the 25 GB recording density to be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising:
    a substrate; and
    an information layer provided on the substrate,
    wherein the information layer comprises:
    a recording layer with respect to which information can be recorded and reproduced through irradiation with a laser beam having a predetermined wavelength;
    a first protective layer that is located, with respect to the recording layer, on a side on which the laser beam is incident; and
    a second protective layer that is located, with respect to the recording layer, on the opposite side to the side to which the laser beam is incident, and
    wherein a refractive index n1 of the first protective layer and a refractive index n2 of the second protective layer at the predetermined wavelength of the laser beam satisfy a relationship of n2<n1.

2. The optical information recording medium according to claim 1, wherein the information layer has a transmittance of at least 50% with respect to the laser beam having a predetermined wavelength, with the recording layer being in an unrecorded state.

3. The optical information recording medium according to claim 2, wherein a first information layer to an N-th information layer (N denotes an integer of 2 or larger) are provided on the substrate sequentially from the side to which the laser beam is incident, and
    at least the first information layer is the information layer.

4. The optical information recording medium according to claim 1, wherein the information layer further comprises a reflective layer that is located, with respect to the second protective layer, on the opposite side to the side on which the laser beam is incident.

5. The optical information recording medium according to claim 4, wherein the reflective layer contains at least one element selected from the group consisting of Ag, Cu, and Au.

6. The optical information recording medium according to claim 4, wherein the reflective layer has a thickness of 15 nm or less.

7. The optical information recording medium according to claim 1, wherein the refractive index n1 satisfies a condition of n1>2.0.

8. The optical information recording medium according to claim 1, wherein the refractive index n1 and the refractive index n2 satisfy a condition of n1−n2>0.2.

9. The optical information recording medium according to claim 1, wherein the second protective layer contains at least one of an oxide and a fluoride.

10. The optical information recording medium according to claim 9, wherein the second protective layer contains at least one compound selected from the group consisting of $ZrO_2$, $SiO_2$, $Cr_2O_3$, $Al_2O_3$, $SnO_2$, ZnO, $Ga_2O_3$, and $LaF_3$.

11. The optical information recording medium according to claim 1, wherein the recording layer is formed of a material containing Te, O, and M, where the M denotes at least one element selected from the group consisting of a metallic element, a metalloid element, and a semiconductor element.

12. The optical information recording medium according to claim 11, wherein the M is at least one element selected from the group consisting of Pd, Au, Pt, Ag, Cu, Ni, Sb, Bi, Ge, Sn and In.

13. The optical information recording medium according to claim 1, wherein the recording layer is formed of a material that contains O and at least one element selected from the group consisting of Sb, Sn, In, Ge, Ni, Mo, W, Zn, and Ti.

14. The optical information recording medium according to claim 1, wherein the recording layer includes at least two isolation layers, and optical characteristics of the recording layer change after the irradiation with the laser beam.

* * * * *